(12) United States Patent
Bucur

(10) Patent No.: US 6,597,153 B1
(45) Date of Patent: Jul. 22, 2003

(54) FAST TRANSIENT CHARGING CIRCUIT

(75) Inventor: Constantin Bucur, Santa Clara, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 10/161,282

(22) Filed: Jun. 3, 2002

(51) Int. Cl.[7] .............................. H02J 7/00; H02J 3/00
(52) U.S. Cl. .......................................... 320/128; 363/34
(58) Field of Search ................................ 320/128, 161, 320/162, 164; 307/64, 66, 67, 80, 81, 85, 86, 87; 363/34

(56) References Cited

U.S. PATENT DOCUMENTS

| | | | |
|---|---|---|---|
| 4,472,672 A | 9/1984 | Pacholok | 320/145 |
| 4,476,425 A | 10/1984 | Chernotsky et al. | 320/143 |
| 4,621,313 A | 11/1986 | Kiteley | 363/49 |
| 4,748,550 A | 5/1988 | Okado | 363/98 |
| 5,187,425 A | 2/1993 | Tanikawa | 320/138 |
| 5,355,073 A | 10/1994 | Nguyen | 320/116 |
| 5,408,150 A | 4/1995 | Wilcox | 327/108 |
| 5,465,039 A | 11/1995 | Narita et al. | 320/164 |
| 5,698,964 A | 12/1997 | Kates et al. | 320/164 |
| 5,723,970 A | 3/1998 | Bell | 320/140 |
| 5,739,667 A * | 4/1998 | Matsuda et al. | 320/128 |
| 5,786,685 A | 7/1998 | Lange et al. | 323/270 |
| 5,898,234 A | 4/1999 | Kitagawa | 307/48 |
| 6,118,254 A | 9/2000 | Faulk | 320/141 |
| 6,175,166 B1 * | 1/2001 | Bapat | 307/64 |

* cited by examiner

*Primary Examiner*—Edward H. Tso
*Assistant Examiner*—Pia Tibbits
(74) *Attorney, Agent, or Firm*—Grossman Tucker Perreault & Pfleger, PLLC

(57) ABSTRACT

A charging circuit includes a fast transient input path to improve the transient response of the charging circuit and to avoid related problems such as inadvertent tripping of a power source. A charging circuit system and laptop computer including a charging circuit consistent with the invention is also provided. A method of allocating power from a power source configured to charge a battery includes sensing at least one predetermined supply parameter from a power source, providing a first control signal after a first time interval based on the sensing, providing a second control signal after a second time interval based on the sensing, wherein the second time interval is less than the first time interval, and regulating power to the battery based on at least one of the first and second control signals.

32 Claims, 2 Drawing Sheets

FAST TRANSIENT CHARGING CIRCUIT

FIELD OF THE INVENTION

This invention relates to charging circuits for use in a variety of portable devices, and more particularly to a charging circuit with a fast transient input current path.

BACKGROUND OF THE INVENTION

Portable electronic devices such as laptop computers, cell phones, pagers, personal digital assistants, and the like are becoming a more common tool in today's society as the capabilities and uses of such devices continues to expand. Many portable electronic devices now include rechargeable batteries such as lithium, nickel-cadmium, or nickel-metal hydride batteries.

Some portable electronic devices may have integral charging circuits so that the battery may be recharged without removing the battery from the device. For instance, when the portable device is coupled to a power source, e.g., an AC/DC adapter providing a DC output voltage from a conventional 120 volt AC wall outlet, the charging circuit provides power to charge the battery.

The charging circuit may be further provided with a power allocation feature. In general, this power allocation feature serves to better utilize the power from a power source by varying the power provided to recharge the battery inversely with the power requirements for the rest of the portable device's system such that the sum of the two is within some maximum predetermined tolerance limits of the power source. For instance, with a constant voltage power source, the charging current level for the battery may be varied inversely with the current level required for the balance of the portable device's system to keep the sum within a predetermined maximum level of supply current from the power source. As such, unnecessary tripping of the power source should normally be prevented.

Such a power allocation feature typically has an input current path responsive to a sensed signal representative of the current provided by the power supply, a charging current path responsive to a sensed signal representative of the charging current provided to the portable device's battery, and a charging voltage path responsive to a sensed signal representative of the charging voltage provided to the portable device's battery.

However, the response time for the input current path and the charging current path is typically the same. Hence, the charging circuit is susceptible to transient conditions that may cause unintended tripping of the local power source. As fast load changes caused by high speed logic and microprocessors have increased, these transient conditions have also increased. For instance, the charging circuit may not be fast enough to decrease the charging current level to the battery in order to keep the local power source within a predetermined maximum parameter, e.g., current rating. Accordingly, there is a need in the art for a charging circuit with a power allocation feature having a fast transient input current loop.

BRIEF SUMMARY OF THE INVENTION

A charging circuit consistent with the invention includes: a first path configured to accept a signal representative of at least one supply parameter from an associated power source and provide a first control signal; a second path configured to accept the signal representative of the at least one supply parameter and provide a second control signal, wherein the second path has a faster transient response time than the first input path; a third path configured to accept a signal representative of at least one charging parameter from an associated battery and provide a third control signal; and a regulating circuit configured to accept the first, second, and third control signals and regulate the at least one charging parameter for the associated battery depending on at least one of the first, second, or third control signals.

A charging circuit system consistent with the invention includes: a power source having at least one predetermined supply parameter with a predetermined maximum rating; a battery; a sensor configured to sense the at least one predetermined supply parameter and provide a sense signal representative of the at least one parameter; and a charging circuit including: a first path configured to accept the sense signal and provide a first control signal; a second path configured to accept the sense signal and provide a second control signal, wherein the second path is configured to have a faster transient response time than the first path; and a third path configured to accept a signal representative of at least one charging parameter from the battery and provide a third control signal; and a regulating circuit configured to accept the first, second, and third control signals and regulate the at least one charging parameter for the battery depending on at least one of the first, second, or third control signals.

A laptop consistent with the invention includes: a CPU; a battery; and charging circuit including: a first path configured to accept a signal representative of at least one supply parameter from an associated power source and provide a first control signal; a second path configured to accept the signal representative of the at least one supply parameter and provide a second control signal, wherein the second path has a faster transient response time than the first input path; third path configured to accept a signal representative of at least one charging parameter from an associated battery and provide a third control signal; and a regulating circuit configured to accept the first, second, and third control signals and regulate the at least one charging parameter for the associated battery depending on at least one of the first, second, or third control signals.

A method of allocating power from a power source configured to charge a battery consistent with the invention includes the steps of: sensing at least one predetermined supply parameter from the power source; providing a first control signal after a first time interval based on the sensing; providing a second control signal after a second time interval based on the sensing, wherein the second time interval is less than the first time interval; and regulating power to the battery based on at least one of the first and second control signals.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
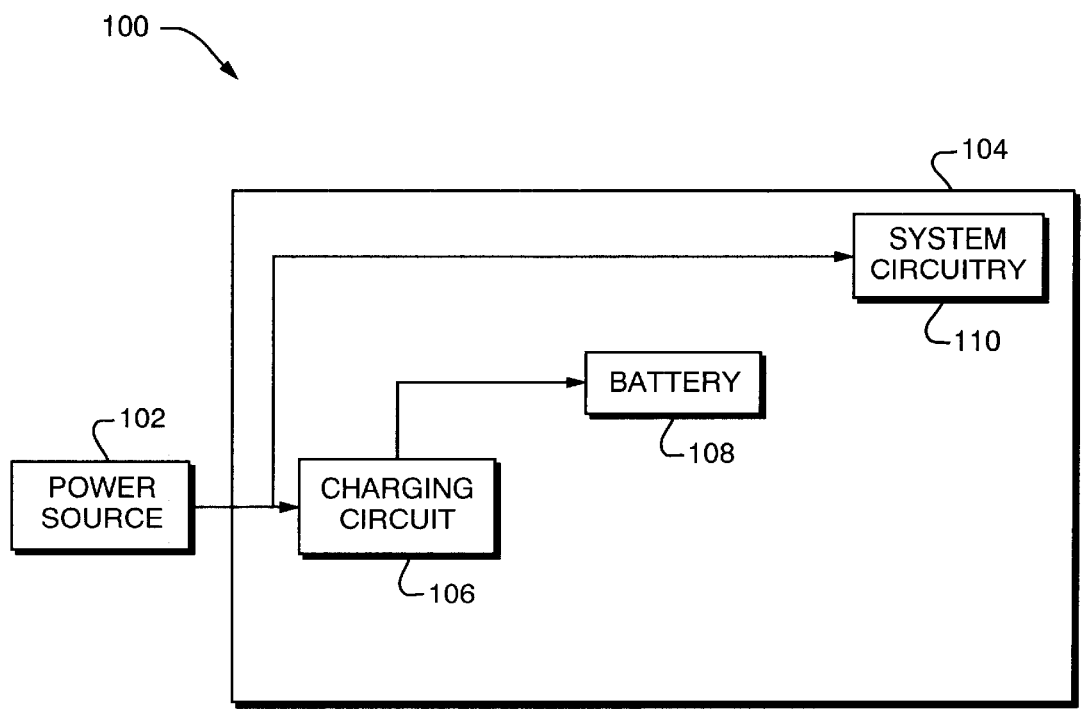
FIG. 1 is a block diagram of an exemplary portable electronic device having a charging circuit consistent with the present invention.

Turning to FIG. 1, a block diagram of a portable device system 100 including a portable electronic device 104 and power source 102 is illustrated. The portable electronic device 104 may be any variety of devices including laptop computers, cell phones, pagers, personal digital assistants, and the like that require a self contained power source such as a rechargeable battery 108 which facilitate the portable nature of such devices. The rechargeable battery 108 may include such batteries as lithium, nickel-cadmium, nickel-metal hydride batteries, or the like.

If the portable electronic device 104 is a laptop computer it would include a variety of components known to those skilled in the art which are not illustrated in FIG. 1. For example, the laptop may include an input device for inputting data to the laptop, a central processing unit (CPU) or processor, for example a Pentium processor available from Intel Corporation, for executing instructions and controlling operation of the laptop, and an output device, e.g., a LCD or speakers, for outputting data from the laptop.

To recharge the battery 108, a power source 102, e.g., a power converter, may be coupled to the portable electronic device 104. For instance, the power source 102 may be an AC/DC adapter which is configured to receive conventional 120 volts AC from a wall outlet and convert it to a DC output voltage for the portable electronic device 104. Such an AC/DC adapter may be rated to provide an output DC voltage at a maximum current rating, e.g., 24 volts DC at 1.5 amps. The power converter 102 may also be a DC/DC adapter such as a "cigarette lighter" type adapter configured to plug into that type of socket. Such a power source 102 is illustrated in FIG. 1 as separate from the portable electronic device 104, but it may be built into some portable devices.

The DC power from the power source 102 may be accepted by a charging circuit 106 consistent with the present invention. The charging circuit 106 generally senses the power level provided by the power source 102 and the power level provided to the battery 108 while the battery is being recharged. Because the power requirements for the system circuitry 110 of the device 104 may vary with time, a charging circuit 106 consistent with the invention is configured with a power allocation feature to vary the power provided to the battery during charging such that the sum of the power drawn by the battery 108 during charging and the system circuitry 110 does not exceed the power rating of the power source 102. Because the power source 102 typically has a constant output DC voltage, the power allocation feature typically monitors the charging current provided to the battery 108 and the supply current from the power source 102 to ensure that a predetermined maximum shutoff threshold of the power source 102 is not exceeded. The shutoff threshold is typically some percentage, e.g. 50%, above a maximum rating.

Figure 2:
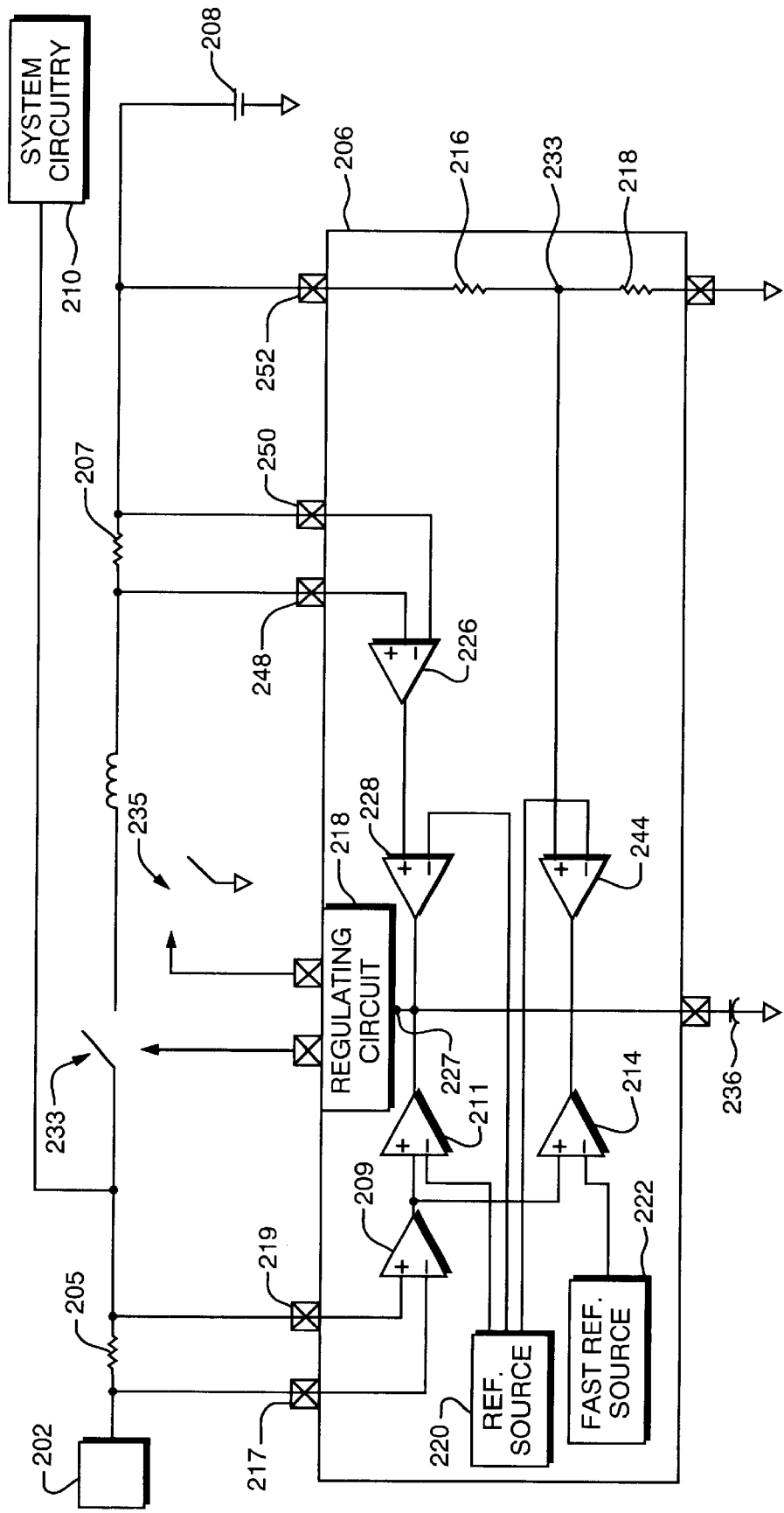
FIG. 2 is a more detailed block diagram of the charging circuit of FIG. 1 consistent with the invention.

Turing to FIG. 2, an exemplary embodiment of a charging circuit 206 consistent with the present invention having a power allocation feature with a fast transient input current path as detailed further herein is illustrated. Such a fast transient input current path enables the battery charging circuit 206 to more quickly respond to transients that may otherwise result in unintended tripping of the power source 202.

A plurality of control paths are provided within the charging circuit 206 for monitoring power consumption data and providing associated control signals to a regulating circuit 218. The regulating circuit 218 is responsive to the control signals from the plurality of control paths to control a charging rate for the battery 208. For instance, a charging current level or voltage level to the battery 208 may be modified to keep the power source 202 within predetermined power limits.

In particular, an input control signal from terminals 217, 219 to an input terminal 227 of the regulating circuit 218 having a normal or slower transient response may include a current sense amplifier 209, and an error amplifier 211 as illustrated in FIG. 2. Such a normal or slower transient response time is more typical for providing a control signal to a regulating circuit 218 including a DC-DC converter since it has the advantage of being stable.

Such a normal transient response path may accept a signal from a sense resistor 205 representative of the current supplied from the power source 202, e.g., an AC/DC adapter or a DC cigarette type adapter. Such a signal may be the voltage drop across the sense resistor 205, which would be proportional to the current supplied from the power source 202. The current sense amplifier 209 accepts the signal from the sense resistor 205 and provides an output proportional to the voltage drop across the first sense resistor 205. The error amplifier 211 generates a control signal for the regulating circuit 218 representative of the error or difference between a reference voltage level provided by a reference source 220 and the output from the current sense amplifier 209. The regulating circuit 218 may then be responsive to such control signal to make adjustments to the power provided to charge the battery 208.

Advantageously, another control signal path from terminals 217, 219 to an input terminal 227 of the regulating circuit 218 having a fast transient response is also provided in a charging circuit 206 consistent with the invention. This control signal path may include the current sense amplifier 209, and an error amplifier 214. As with the other normal transient response control signal path, the current sense resistor 205 and current sense amplifier 209 provide an amplified signal representative of the current supplied by the power source 202. The error amplifier 214 then generates a fast transient control signal for the regulating circuit 218 representative of the error or difference between a reference voltage level, which may be provided by a fast reference source 222, and the output from the current sense amplifier 209. The reference voltage level provided by the fast reference source 222 should be about 25% greater than the value of the reference voltage provided by the normal reference source 220 in order not to be triggered by a normal system over-current.

In addition to the normal and fast transient control signal paths, additional control signal paths providing control signals representative of various operating conditions of the battery 208 may also be provided. For instance, a battery current path may provide a control signal representative of the charging or discharging current flow to and from the battery 208, while a battery voltage path may provide another control signal representative of a voltage level of the battery 208. The battery current path from terminals 248, 250 to an input terminal 227 of the regulating circuit 218 may include a current sense amplifier 226, and an error amplifier 228 as illustrated in FIG. 2. The sense resistor 207 provides a signal to the current sense amplifier 226 through terminals 248, 250 representative of the charging or discharging current provided to the battery 208. This signal is equivalent to the voltage drop across the sense resistor 207.

The current sense amplifier 226 accepts the signal from the sense resistor 207 and provides an output proportional to the voltage drop across the sense resistor 207. The error amplifier 228 generates a control signal for the regulating circuit 218 representative of the error or difference between a reference voltage level provided by a reference source 220 and the output from the current sense amplifier 226. The regulating circuit 218 may then be responsive to such control signal, e.g., to make any necessary adjustments to the charging current provided to the battery 208.

In addition, the battery voltage path from terminal 252 to an input terminal 227 of the regulating circuit 218 may include a pair of resistors 216, 218 together with an error amplifier 244 configured to monitor the battery charging voltage. The pair of resistors 216, 218 form a voltage divider for scaling the voltage of the battery 208 to a voltage near that provided by the voltage reference source 220. The error amplifier 244 may then provide a control signal to the regulating circuit 218 dependent on the difference between the voltage at node 233 and the voltage provided by the voltage reference source 220. The regulating circuit 218 may then be responsive to this control signal to maintain battery voltage at desired levels.

The control signals from the various paths, including the fast transient input path, are all provided to the regulating circuit 218. Such regulating circuit may be any variety of circuits known to those skilled in the art for controlling power levels provided to the battery 208. One exemplary regulating circuit 218 may include a pulse width modulated (PWM) switching transistor circuit functioning as a DC-DC converter. The PWM signal may be generated by a comparator comparing the output signal from a respective error amplifier 211, 214, 228, or 244 with an input ramp signal. The resulting PWM signal may then control a switching circuit to boost, e.g., with the switching transistor in parallel with the load, or buck, e.g., with a switching transistor in series with the load, the input DC voltage to the desired output DC voltage level.

For instance, when the charging circuit 206 is charging the battery 208, switches 233 and 235 external to the charging circuit 206 may be closed. The various paths of the charging circuit 206 provide control signals to the regulating circuit 218 representative of the power conditions of the power source 202 and the charging power conditions for the battery 208. The fast transient input control signal path may provide a control signal indicative of a supply current level greater than a predetermined maximum supply rating from the power source 202.

Advantageously, the regulating circuit 218 is responsive to this control signal to quickly decrease the charging current provided to the battery 208. In this way, the power source 202 may avoid an unintended trip that may otherwise occur if the charging current was not so quickly reduced. This occurs when the regulating circuit 218 is able to decrease charging current to the battery 208 quick enough so the total current from the system circuitry 210 and the battery charging current remains less than a predetermined maximum shutoff threshold for the power source 202. For some power sources such as an AC/DC adapter, such a predetermined maximum shutoff threshold level may be about 50% higher than a normal maximum rating for the AC/DC adapter.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A charging circuit comprising:
    a first path configured to accept a signal representative of at least one supply parameter from an associated power source and provide a first control signal;
    a second path configured to accept said signal representative of said at least one supply parameter and provide a second control signal, wherein said second path has a faster transient response time than said first input path;
    a third path configured to accept a signal representative of at least one charging parameter from an associated battery and provide a third control signal; and
    a regulating circuit configured to accept said first, second, and third control signals and regulate said at least one charging parameter for said associated battery depending on at least one of said first, second, or third control signals.

2. The charging circuit of claim 1, wherein said second path has a transient response time at least five times faster than said first path.

3. The charging circuit of claim 1, wherein said at least one predetermined supply parameter is a supply current from said power source.

4. The charging circuit of claim 1, wherein said at least one charging parameter is a charging current provided to said battery.

5. The charging circuit of claim 1, wherein said second path comprises a second error amplifier configured to provide said second control signal.

6. The charging circuit of claim 5, wherein said second error amplifier is configured to receive a first input error signal based on said signal representative of said at least one predetermined supply parameter and a second input error signal based on a second reference voltage signal, and provide said second control signal based on the difference between first input error signal and second input error signal.

7. The charging circuit of claim 6, wherein said second path further comprises a sense amplifier coupled to said error amplifier, wherein said sense amplifier is configured to receive said signal representative of at least one supply parameter from said associated power source and provide said first input error signal.

8. The charging circuit of claim 7, wherein said first path comprises a first error amplifier configured to provide said first control signal.

9. The charging circuit of claim 8, wherein said first error amplifier is configured to receive said first input error signal based on said signal representative of said at least one predetermined supply parameter and a third input error signal based on a first reference voltage signal, and provide said first control signal based on the difference between said first input error signal and third input error signal.

10. The charging circuit of claim 9, wherein said second voltage reference signal is at least 25% greater than said first voltage reference signal.

11. The charging circuit of claim 10, wherein a first voltage reference source provides said first voltage reference signal and a second voltage reference source provides said second voltage reference signal.

12. A charging circuit system comprising:
    a power source having at least one predetermined supply parameter with a predetermined maximum rating;
    a battery;
    a sensor configured to sense said at least one predetermined supply parameter and provide a sense signal representative of said at least one parameter; and
    a charging circuit comprising:
        a first path configured to accept said sense signal and provide a first control signal;
        a second path configured to accept said sense signal and provide a second control signal, wherein said second path is configured to have a faster transient response time than said first path; and a third path configured to accept a signal representative of at least one charging parameter from said battery and provide a third control signal; and a regulating circuit configured to accept said first, second, and third control signals and regulate said at least one charging parameter for said battery depending on at least one of said first, second, or third control signals.

13. The system of claim 12, wherein said second path has a transient response time at least five times faster than said first path.

14. The system of claim 12, wherein said at least one predetermined supply parameter is a supply current from said power source.

15. The system of claim 12, wherein said at least one charging parameter is a charging current provided to said battery.

16. The system of claim 12, wherein said second path comprises a second error amplifier configured to provide said second control signal.

17. The system of claim 16, wherein said second error amplifier is configured to receive a first input error signal based on said sense signal and a second input error signal based on a second reference voltage signal, and provide said second control signal based on the difference between first input error signal and second input error signal.

18. The system of claim 17, wherein said second path further comprises a sense amplifier coupled to said error amplifier, wherein said sense amplifier is configured to receive said sense signal and provide said first input error signal.

19. The system of claim 18, wherein said first path comprises a first error amplifier configured to provide said first control signal.

20. The system of claim 19, wherein said first error amplifier is configured to receive said first input error signal based on said sense signal and a third input error signal based on a first reference voltage signal, and provide said first control signal based on the difference between said first input error signal and third input error signal.

21. The system of claim 20, wherein said second voltage reference signal is at least 25% greater than said first voltage reference signal.

22. The system of claim 21, wherein a first voltage reference source provides said first voltage reference signal and a second voltage reference source provides said second voltage reference signal.

23. A laptop comprising:
a CPU;
a battery; and
a charging circuit comprising:
  a first path configured to accept a signal representative of at least one supply parameter from an associated power source and provide a first control signal;
  a second path configured to accept said signal representative of said at least one supply parameter and provide a second control signal, wherein said second path has a faster transient response time than said first input path;
  a third path configured to accept a signal representative of at least one charging parameter from an associated battery and provide a third control signal; and
  a regulating circuit configured to accept said first, second, and third control signals and regulate said at least one charging parameter for said associated battery depending on at least one of said first, second, or third control signals.

24. The laptop of claim 23, wherein said second path has a transient response time at least five times faster than said first path.

25. The laptop of claim 23, wherein said at least one predetermined supply parameter is a supply current from said power source.

26. The laptop of claim 23, wherein said at least one charging parameter is a charging current provided to said battery.

27. The laptop of claim 23, wherein said second path comprises a second error amplifier configured to provide said second control signal.

28. The laptop of claim 27, wherein said second error amplifier is configured to receive a first input error signal based on said signal representative of said at least one predetermined supply parameter and a second input error signal based on a second reference voltage signal, and provide said second control signal based on the difference between first input error signal and second input error signal.

29. The laptop of claim 28, wherein said second path further comprises a sense amplifier coupled to said error amplifier, wherein said sense amplifier is configured to receive said signal representative of at least one supply parameter from said associated power source and provide said first input error signal.

30. A method of allocating power from a power source configured to charge a battery comprising the steps of:
sensing at least one predetermined supply parameter from said power source;
providing a first control signal after a first time interval based on said sensing;
providing a second control signal after a second time interval based on said sensing,
wherein said second time interval is less than said first time interval; and
regulating power to said battery based on at least one of said first and second control signals.

31. The method of claim 30, wherein said second time interval is at least five times less than said first time interval.

32. The method of claim 30, wherein said at least one predetermined supply parameter is a supply current from said power source.

* * * * *